United States Patent
Davis et al.

(10) Patent No.: US 8,036,682 B1
(45) Date of Patent: Oct. 11, 2011

(54) APPARATUS AND METHOD FOR CALL CENTER CALL-BACK

(75) Inventors: Sheldon Davis, Aptos, CA (US); Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1162 days.

(21) Appl. No.: 11/810,377

(22) Filed: Jun. 5, 2007

(51) Int. Cl.
*H04M 3/42* (2006.01)
*H04M 3/00* (2006.01)

(52) U.S. Cl. .................. 455/456.3; 379/202.01; 455/417

(58) Field of Classification Search ............. 379/201.02, 379/210.01, 265.02, 201.01
See application file for complete search history.

(56) References Cited

U.S. PATENT DOCUMENTS

| | | | |
|---|---|---|---|
| 5,155,761 A * | 10/1992 | Hammond .................. | 379/88.2 |
| 6,654,457 B1 * | 11/2003 | Beddus et al. ........... | 379/265.02 |
| 6,879,677 B2 * | 4/2005 | Trandal et al. ........... | 379/215.01 |
| 7,227,937 B1 * | 6/2007 | Yoakum et al. .......... | 379/201.01 |
| 7,573,996 B1 * | 8/2009 | Somani .................... | 379/210.01 |
| 2006/0015388 A1 | 1/2006 | Flockhart et al. | |

FOREIGN PATENT DOCUMENTS

WO    WO 2005122544 A1 *  12/2005

* cited by examiner

*Primary Examiner* — Nick Corsaro
*Assistant Examiner* — Michael S Bush
(74) *Attorney, Agent, or Firm* — John C. Moran

(57) ABSTRACT

A call center allows a customer to select the type of callback service which the customer wishes the call center to utilize when placing a call back to the customer. The call center then tests for the presence of a device specified by the customer. When the presence of the device is detected on an Internet/network, the call center will place a call to the customer via a device specified by the customer. Also, a call center allows a user to select the type of callback service which the customer wishes to use for a later communication with the call center. When the call center has the capability of providing the selected type of callback service, the call center indicates this capability by publishing a service presence. A customer device detects the published service presence and alerts the customer who establishes communication with the callback center.

4 Claims, 9 Drawing Sheets

APPARATUS AND METHOD FOR CALL CENTER CALL-BACK

TECHNICAL FIELD

This invention relates to call centers, and particularly, to callback operations of a call center.

BACKGROUND OF THE INVENTION

A well-known problem in the operations of call centers is the fact that customers become frustrated when placing a call to a call center and not being serviced in a reasonable amount of time. To complicate the problem, if the customer leaves their telephone number, an agent of the call center may waste valuable time placing a call to the customer if the customer is unavailable.

SUMMARY OF THE INVENTION

In an embodiment, a call center allows a customer to select the type of callback service which the customer wishes the call center to utilize when placing a call back to the customer. The call center then tests for the presence of a device specified by the customer. When the presence of the device is detected on an Internet/network, the call center will place a call to the customer via a device specified by the customer.

In another embodiment, a call center allows a user to select the type of callback service which the customer wishes to use for a later communication with the call center. When the call center has the capability of providing the selected type of callback service, the call center indicates this capability by publishing a service presence. A customer device detects the published service presence and alerts the customer who establishes communication with the callback center.

DETAILED DESCRIPTION

Figure 1:
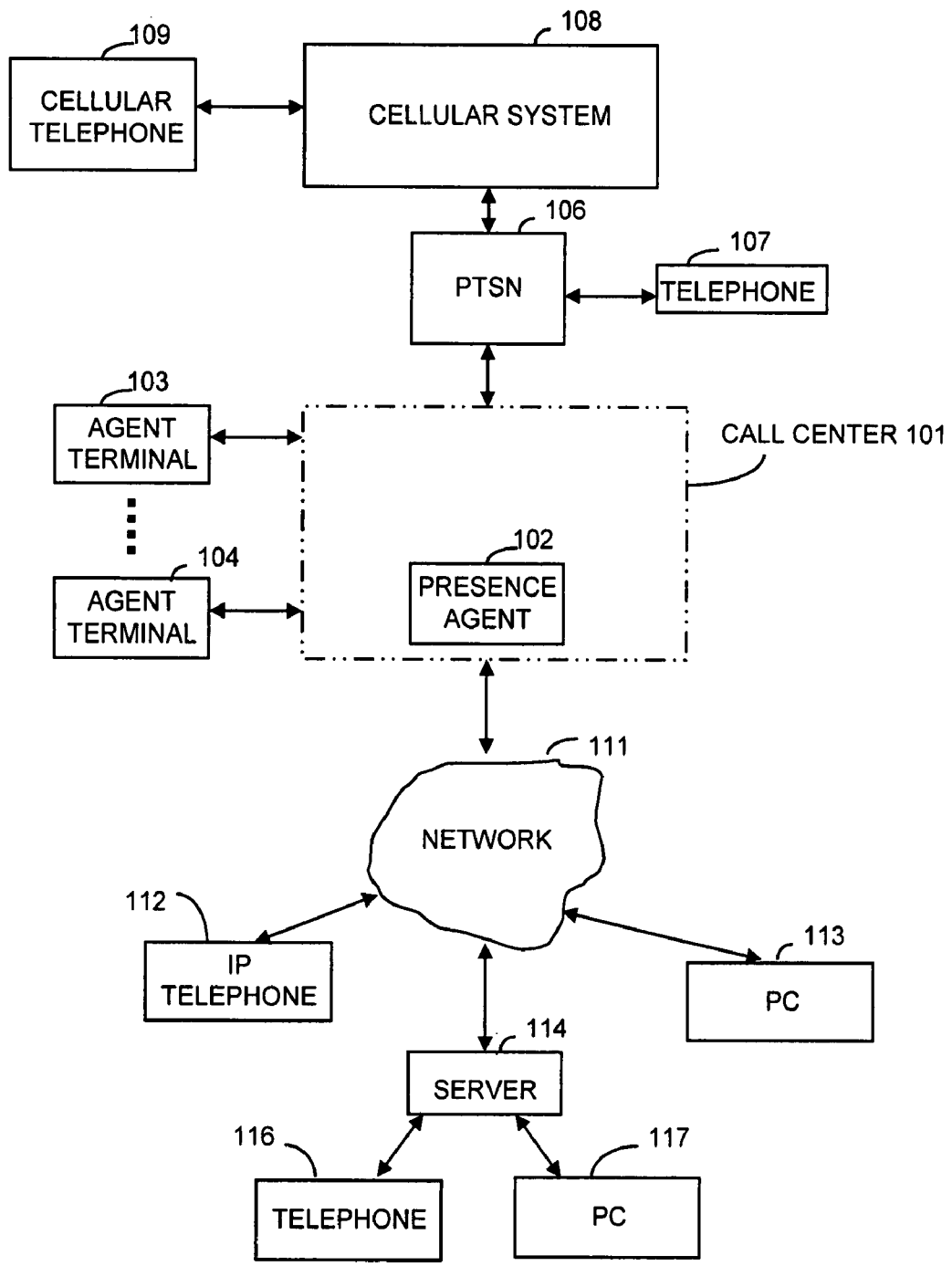
FIG. 1 illustrates, in block diagram form, an embodiment.

FIG. 1 illustrates an embodiment for implementing the invention. Call center 101 provides call center operations for cellular telephones such as cellular telephone 109 via cellular system 108 and public telephone switching network (PTSN) 106, telephone 107 via PTSN 106, IP telephone 112 and PC 113 via network 111, and telephone 116 and PC 117 via server 114 and network 111 using agents at agent terminals 103-104. Network 111 is one of a variety of networks such as the Internet or other types of data switching networks well known those skilled in the art that can communicate IP protocol or other digital protocol information. When a customer using IP telephone 112 places a call to call center 101 via network 111 and call center 101 can not immediately connect the customer to an agent, call center 101 gives the customer the option of being called back and allows the customer to specify the media to be utilized for the callback, topic for callback, and a particular agent or type of agent that is to perform the callback. This ability to specify media and/or agent is referred to as specifying the callback service. Server 114 may be located in a home or small office and interconnected to network 309 using cable wired or electromagnetic communication. A number of devices within the home or small office may be connected to server 347 to gain access to network 309. Note, the customer may specify that any media will be acceptable for the callback. Call center 101 records the customer's specifications for the callback and utilizing the SIP presence protocol as defined in RFC 3856 to monitor IP telephone 112 using presence agent 102 or another communication device specified by the customer such as cellular telephone 109 or PC 113 for the presence of the customer. The customer is capable of specifying not only that the media be voice but also that the media could be other types such as instant messaging or text messaging.

Call center 101 would utilize information from cellular system 108 to determine the presence of the customer at cellular telephone 109 if that had been specified by the customer utilizing techniques well known to those skilled in the art.

If the customer had specified or called from telephone 116 or PC 117, call center 101 would utilize presence agent 102 to monitor these devices utilizing server 114 using the SIP protocol whereby server 114 determines the presence of the customer at telephone 116 or PC 117 and publishes the presence information to call center 101 via the presence SIP protocol. Note, that the customer's presence can be determined from a variety of digital devices such as personal digital assistants (PDA).

Call center 101 upon receiving the callback specifications from the customer places the customer in a pool of customers waiting to obtain service. Within this customer pool, the customer waiting callback is processed as if the customer had remained on hold waiting for the service. When the customer's presence is detected on a specified terminal, the requested service is available, and the customer's callback is selected from the customer pool, a callback call via the specified media is placed to the customer. Note, that the callback call is used in a general sense since the media selected by the customer may not be voice media. The selection from the customer pool may use rule based routing as described in U.S. Patent Application Publication 2006/0015388 which is hereby incorporated by reference. When the system of U.S. Patent Application Publication 2006/0015388 is used the customer pool would be part of the work entry pools and the services would be part of the resource entry pools. In a call center that places customers into queues which are pre-ordered pools, a customer pool would be a queue. Call centers that use queues are well known by those skilled in the art.

In another embodiment, the user may specify the type of media, topic, type of agent or specific agent using information that is presented in a visual or audio to the customer by call center 101. The customer then selects from this information to specify the callback. If the customer had previously called the call center, the information would specify the identification of the various devices that were used by the customer and that could be used to define the presence of the customer. In addition, the information could define the types of agents and topics that could be the subject of the callback. The presentation of such information in either visual or audio format is well known to those skilled in the art.

In another embodiment, the customer could be engaged with an agent in one media but wish to switch to another media. If an agent is not available to handle the other media, call center 101 would place the customer in a customer pool until such an agent is available and the customer was selected from the customer pool. Call center 101 would then utilize the presence of the customer to initiate the callback with the new agent. Within the prior art, if a customer is engaged with an agent via a chat session and wishes to start an audio conversation, it is necessary for the customer to re-contact the call center to start such an audio conversation.

Figure 2:
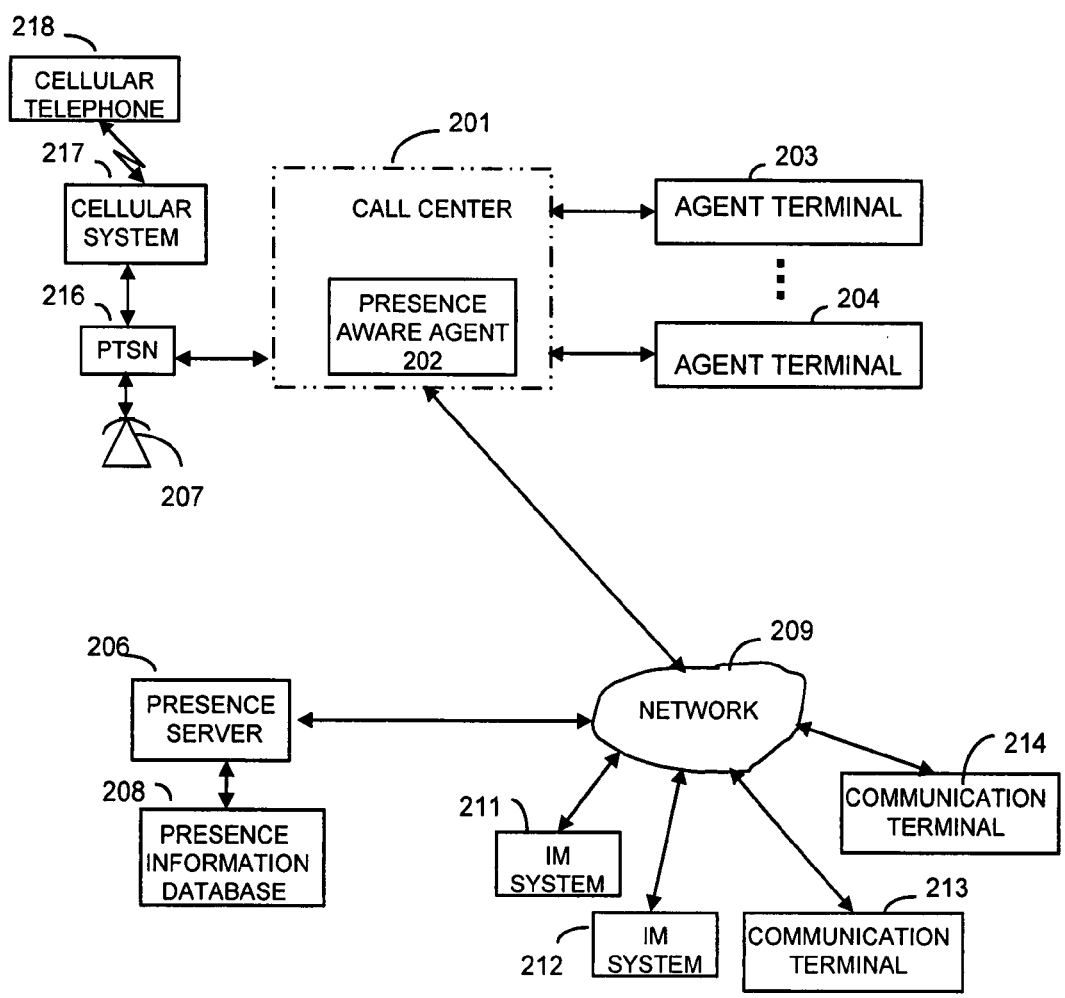
FIG. 2 illustrates, in block diagram form, another embodiment.

FIG. 2 illustrates, in block diagram form, another embodiment for implementing the invention. In FIG. 2, call center 201 does not utilize the SIP presence protocol for determining when a customer may be present on cellular telephone 218, telephone 207, communication terminals, such as communication terminal 214 or on an instant message system such as instant message systems (IM) 211-212. Rather, call center 201 utilizes presence server 206 and presence information database 208 for determining the presence of the customer on the various devices. The operations of these systems with respect to the customer's presence is detailed in U.S. Patent Application Publication 2004/0141594 which is hereby incorporated by reference. IM systems 211 and 212 may be any instant messaging system such as those provided by AOL or MSN messaging systems. In addition, the customer may specify that their presence on an IM system can be utilized to indicate that they want to be called on a telephone such as telephone 207 or a cellular phone such as cellular phone 218. For example, presence server 206 may detect the customer's presence when a communication terminal such as communication terminal 214 is used on network 209 but contact the customer via a telephone such as telephone 207. Network 209 is one of a variety of networks such as the Internet or other types of data switching networks well known those skilled in the art. Call center 201 interconnects to presence server 206 via network 209.

The operations of call center 201 are similar to the operations of call center 101 of FIG. 1.

Figure 3:
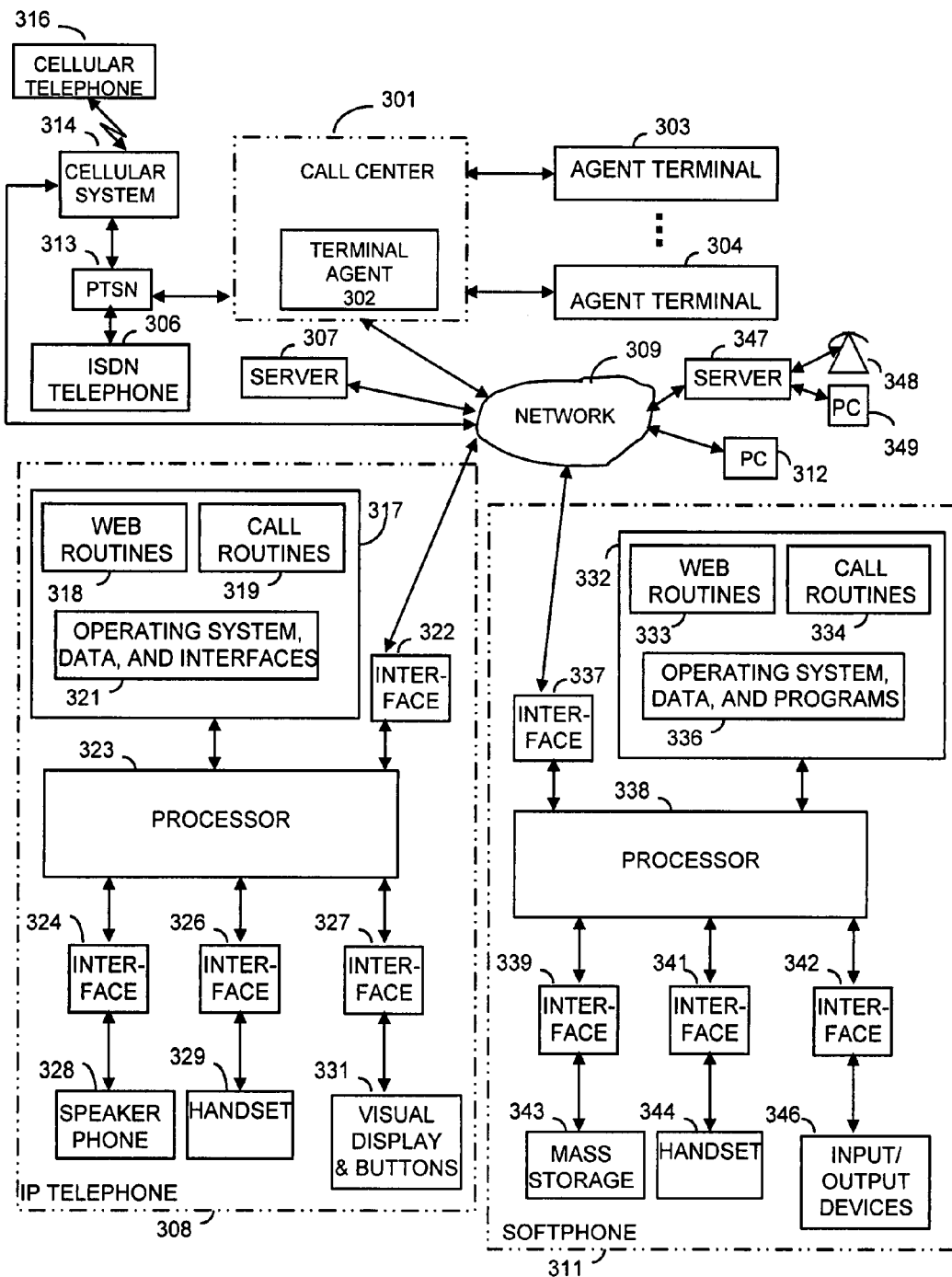
FIG. 3 illustrates, in block diagram form, another embodiment.

FIG. 3 illustrates, in block diagram form, another embodiment for implementing the invention. In the embodiment illustrated in FIG. 3, call center 301 determines the presence of a customer who had requested a callback by information that is transferred to terminal agent 302 of call center 301 from a device utilized by the customer. A routine within the customer device transmits to terminal agent 302 via network 309 the presence of the customer. Network 309 is one of a variety of networks such as the Internet or other types of data switching networks well known those skilled in the art. Note, a routine in cellular telephone 316 transmits to terminal agent 302 via cellular system 314 and network 309. Similarly, a routine within ISDN telephone 306 transmits to terminal agent 302 via PTSN 313. Server 347 maintains the presence information for telephone 348 and PC 349 and transmit this presence information to terminal agent 302.

IP telephone 308 is controlled by processor 323 executing routines out of memory 317. Block 312 provides the normal functions of an operating system and control of interfaces plus the storage of data. Call routines 319 handle the telecommunication operations. Web routines 318 are utilized to access and interact with call center 301 and/or server 307.

Processor 323 is connected to speaker phone 328 via interface 324, connected to handset 329 via interface 326, connected to network 309 via interface 322, and connected to visual display and buttons 331 via interface 327. Visual display and buttons 331 provides the normal buttons, dialing pad, and indicator lights that are associated with an IP telephone. Processor 323 utilizes a routine in Web routines 318 to communicate the presence of the customer to terminal agent 302 via network 309.

For example, if a customer utilizes IP telephone 308 to place a call to call center 301 which cannot be handled at that time by call center 301, upon the customer requesting a callback, processor 323 of IP telephone 308 requests a Web routine either from call center 301 or server 307. This Web routine is stored in Web routines 318. (Note, this Web routine may have been previously stored and would not have to be stored at this time.) The manner in which such Web routines are access and stored is set forth in greater detail in U.S. Patent Application Publication 2004/0057422 which is hereby incorporated by reference.

This stored Web routine monitors for the presence of the customer at IP telephone 308 and transmits this information to terminal agent 302. The customer may indicate their presence at IP telephone 308 by actuating a special button on visual display and buttons 331, or IP telephone 308 may sense this presence utilizing a transducer that responds to the presence of the customer. Such transducers are well known to those skilled in the art. Note, that call center 301 upon being informed of the presence of the user at IP telephone 308 is not limited to communicating with the customer via IP telephone 308 but could establish a instant messaging or chat session with the customer via a personal computer or contact the customer using a different telephone if this had been specified by the customer when the customer requested the callback.

Soft phone 311 is a personal computer that has a handset and is capable of providing telecommunication services. Soft phone 311 would function in a similar manner to IP telephone 308 with respect to receiving a Web routine to be utilized to transfer presence information to terminal agent 302. PC 312 would operate in a similar manner.

Processor 338 controls the operation of soft phone 311 by executing routines from memory 332. Block 336 provides the operating system, data, and application programs that may be utilized by the customer for performing functions other than telecommunication functions. Telecommunication functions are controlled by call routines 334. Interactions via network 309 with call center 301 are controlled by routines in Web routines 333. As described with respect to IP telephone 308, Web routines 333 can be pre-stored or downloaded from call center 301 or server 307.

Processor 338 is interconnected to network 309 via interface 337, connected to mass storage 343 via interface 339, handset 344 via interface 341, and input/output devices 346 via interface 342. Input/output devices 346 would include but are not limited to a display, keyboard, mouse, printer, etc.

If the customer utilizes cellular telephone 316 to request a callback and cellular telephone 316 has Internet capability, then a Web routine for communicating with terminal agent 302 would be communicated to cellular telephone 316 via a network 309 and cellular system 314.

PC 312 is similar in design details to soft phone 311 but does not have call routines 334, interface 341, and handset 344.

ISDN telephone 306 can already have installed a routine for communicating with terminal agent 302 or such a routine can be downloaded to ISDN telephone 306 from PTSN 313. With such a routine, ISDN telephone 306 would function in a manner similar to IP telephone 308 with respect to callbacks from call center 301. Note, telephone 306 maybe any type of digital phone. The internal details of ISDN telephone 306 are similar to those of IP telephone 308.

Figure 4:
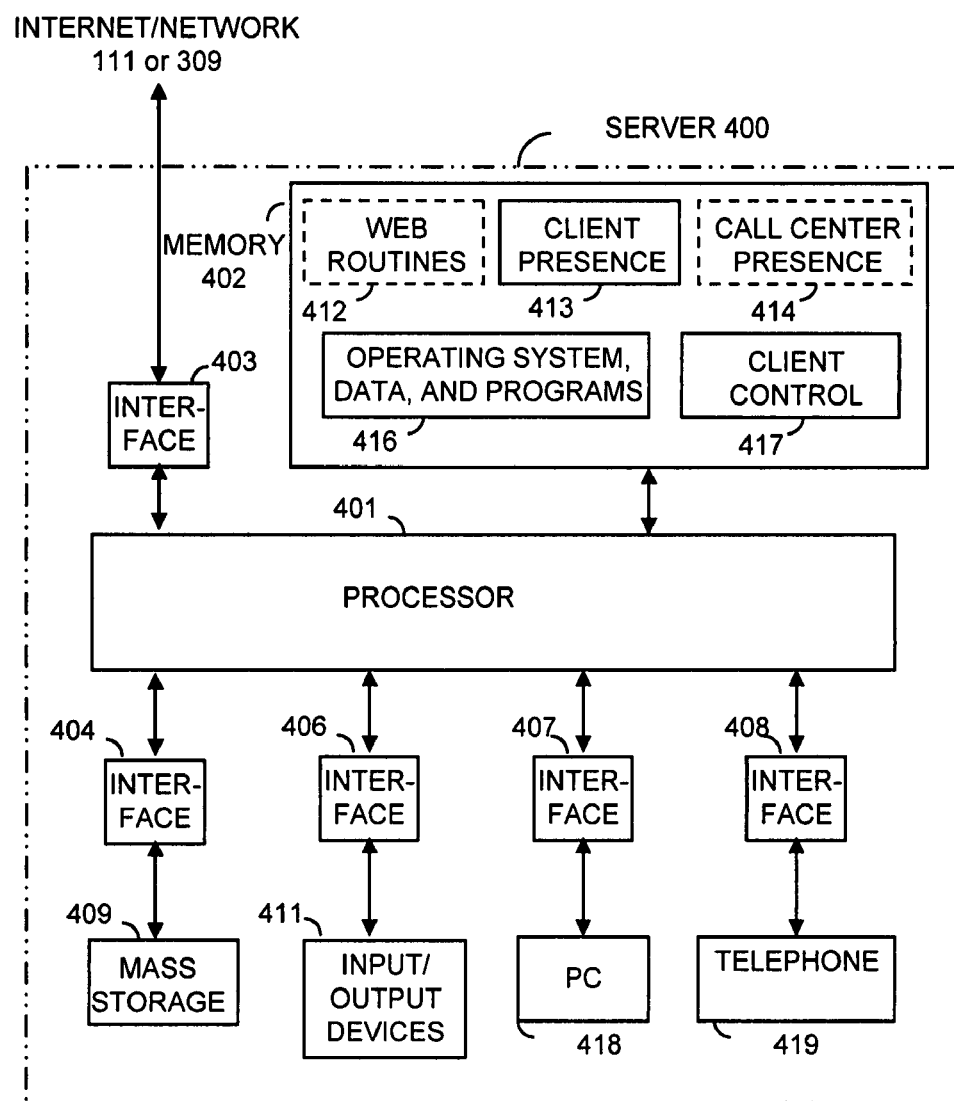
FIG. 4 illustrates, in block diagram form, additional details of a server.

Consider now the details of server 400 as illustrated in FIG. 4. Server 400 may be server 114 or 307 of FIG. 1 or 3, respectfully. Processor 401 controls the overall operation of the server 400 by execution of programs out of memory 402 processor 401 interconnects to the Internet/network via interface 403, mass storage 409 via interface 404, input/output devices 411 via interface 406, PC 418 via interface 407, and telephone 419 via interface 408. The interfaces can connect to their respective devices by being hardwired to the device or by wireless communication of well-known types. PC 418 can be PC 117 of FIG. 1 or PC 349 of FIG. 3. Telephone 419 can be telephone 116 of FIG. 1 or telephone 348 of FIG. 3. As previously noted, there may be more than one PC or telephone for which server 400 is providing communication with the Internet/network. In addition, server 400 can provide communication with the Internet/network for a variety of other devices such as personal digital assistants, televisions, etc. Memory block 416 provides the operating system, data and programs utilized by processor 401 for normal processing.

Client presence routine 413 determines the presence of a user at the PC or telephone using techniques well known to those skilled in the art. Upon detecting the user's presence at a device, client present routine 413 signals either Web routines 412 or call center presence routine 414 depending on which of the above described embodiments is utilizing server 400.

If server 400 is being used in one of the embodiments illustrated in FIGS. 1-3, Web routines 412 will utilize the presence information received from client presence 413 to signal the call center of the presence of the user.

If server 400 is being used by an embodiment where the call center publishes the presence of an agent, a media, etc. (also referred to as publishing a service presence), call center presence 414 utilizes the presence of the call center and the presence of the user as received from client presence 413 to activate client control 417 to establish communication between the call center and the designated device (PC or telephone). Client control 417 also handles communication between Internet/network as is needed by the PC or telephone for other types of operation not related to the call center.

Although FIGS. 1, 2 and 3 have presented three different embodiments, one skilled in the art would immediately the realize that these three different embodiments could be combined into a single system.

Figure 5:
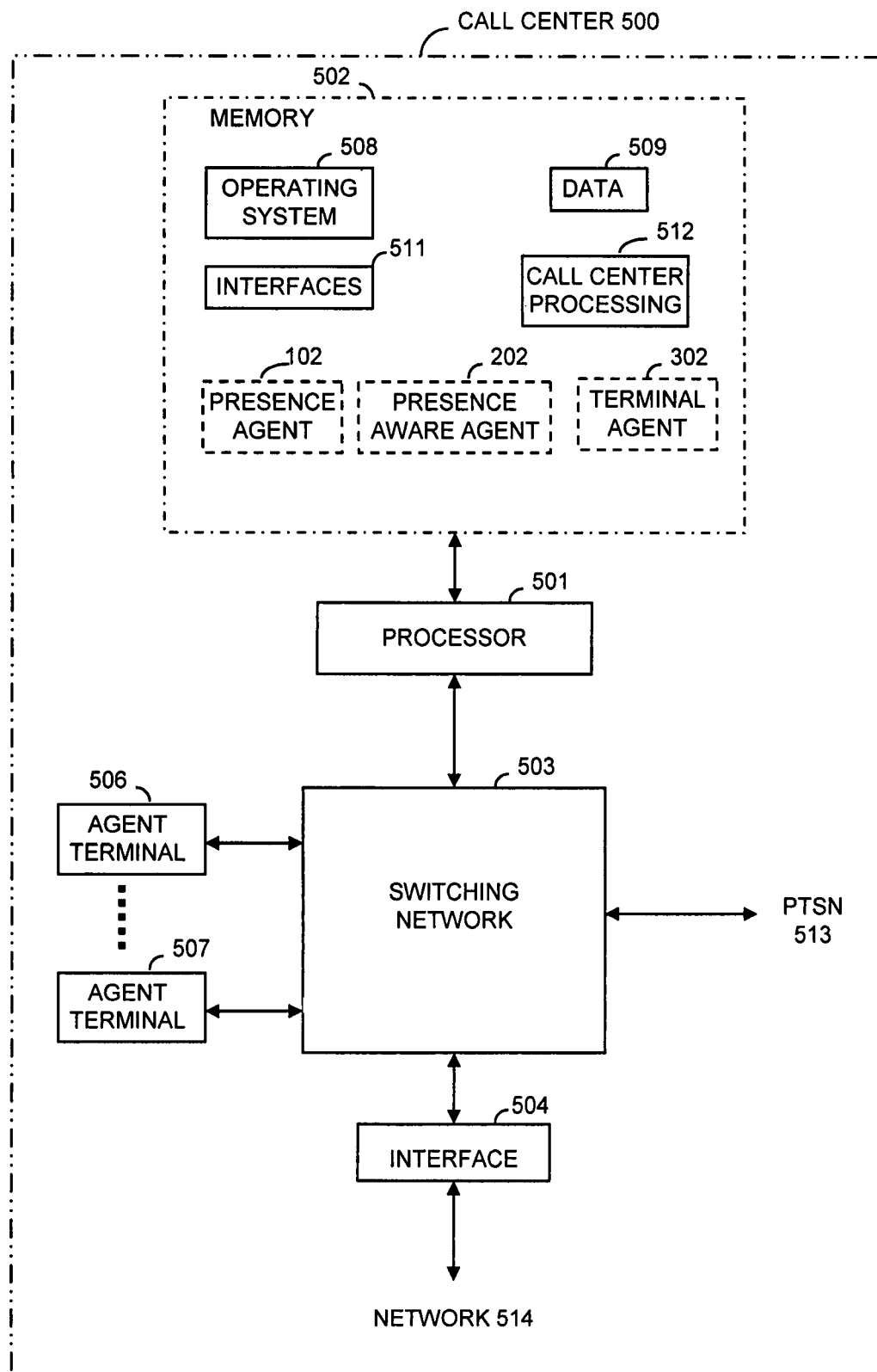
FIG. 5 illustrates, in block diagram form, additional details of a call center.

FIG. 5 illustrates in block diagram form, call center 500. This call center could be call center 101, 201, or 301 of FIG. 1, 2, or 3, respectively. Processor 501 and memory 502 form a computer controls over the operation of call center 500. Processor 501 performs the control by executing programs and utilizing data from memory 502. Processor 501 is interconnected to switching network 503 and controls the operations of switching network 503 in manner well known to those skilled in the art. Processor 501 communicates and controls agent terminals 506-507 via switching network 503. Agent terminals 506-507 may be agent terminals 103-104, 203-204, or 303-304 of FIG. 1, 2, or 3. Processor 501 also communicates with PTSN 513 via switching network 503. PTSN 513 may be PTSN 106, 216, or 313 of FIG. 1, 2, or 3, respectively. Processor 501 interconnects to network 514 via interface 504. Network 514 could be networks 111, 209, or 309, of FIG. 1, 2, or 3.

Operating system 508 supplies overall control of call center 500 when executed by processor 501. Data for call center functions is stored in data 509. Normal call center operations are controlled by execution of call center processing 512.

When call center 500 is utilized in FIG. 1, blocks 202 and 302 are not utilized. The operations of presence agent 102 is described with respect to FIGS. 6, 7, and 8. When call center 500 is utilized in FIG. 2, blocks 102 and 302 are not utilized. The operations of presence aware agent 202 are described with respect to FIGS. 6 and 7. When call center 500 is utilized in FIG. 3, blocks 102 and 202 are not utilized. The operations of terminal agent 302 are discussed with respect to FIGS. 6 and 7.

Figure 6:
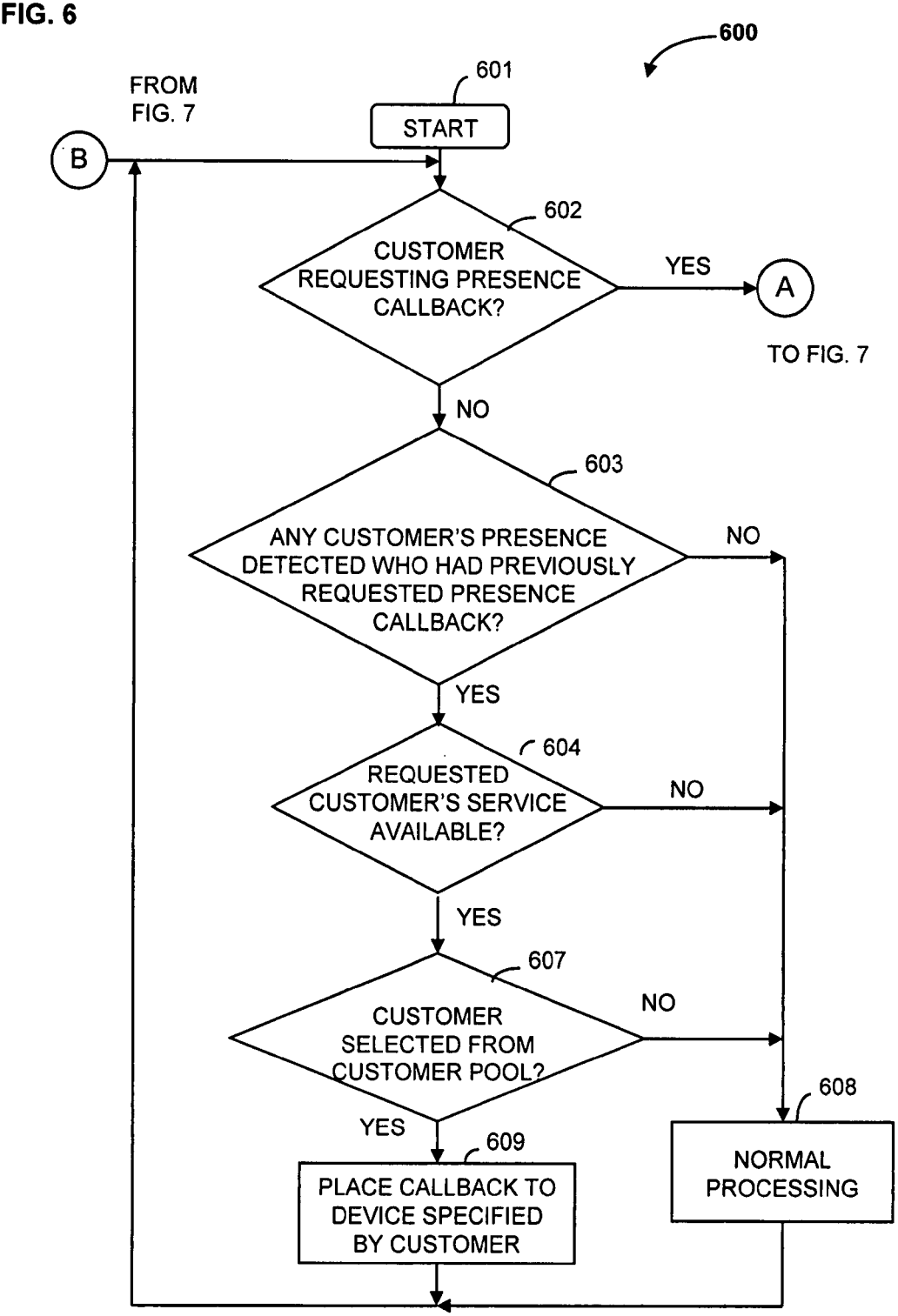
FIGS. 6 and 7 illustrate, in flowchart form, the operations of a call center in an embodiment where the call center senses the presence of a device.
Figure 7:
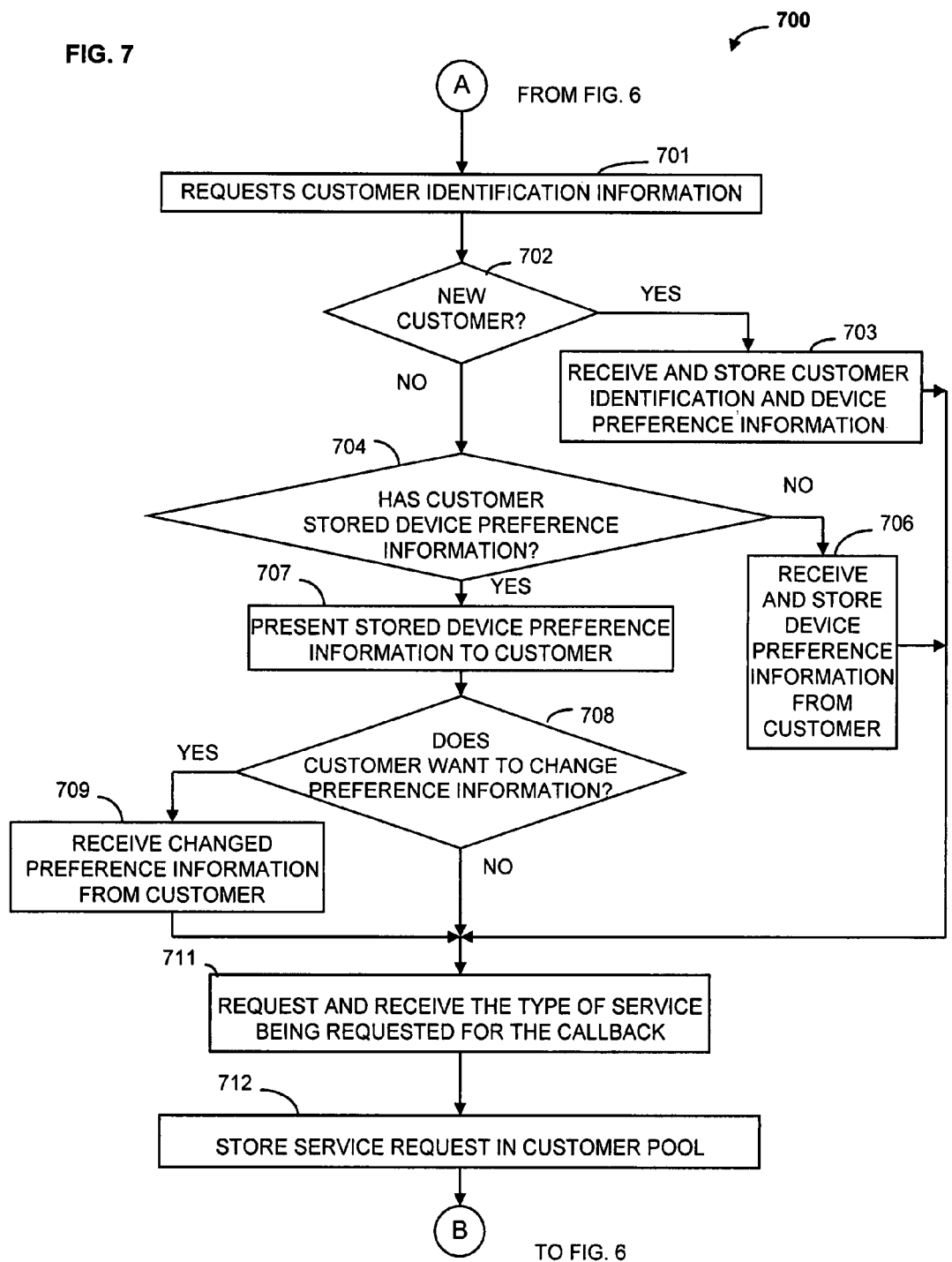

FIGS. 6 and 7 illustrate operations 600 and 700 performed by the embodiments illustrated in FIGS. 1, 2, and 3. After being started in block 601, decision block 602 determines if a customer is requesting a presence call back. A customer may be requesting a presence call back while presently in communication with the call center. If the answer is yes, control is transferred to block 701 of FIG. 7.

If the answer is no in decision block 602, decision block 603 determines if any customer's presence who had previously requested a presence call back has been detected. The detection of the presence of a customer has been individually explained with respect to FIGS. 1, 2, and 3. If the answer in decision block 603 is no, control is transferred to block 608 which performs normal operations before returning control back to decision block 602.

If the answer is yes in decision block 603, decision block 604 determines if requested customer service is available. If the answer is no in decision block 604, control is transferred to block 608. If the answer in decision block 604 is yes, control is transferred to decision block 607.

Decision block 607 determines if the customer is selected from within the customer pool to receive a call back for the requested service. If the answer is no in decision block 607, control is transferred to block 608. If the answer is yes in decision block 607, control is transferred to block 609. Block 609 places the call back to the customer utilizing the device that had been selected by the customer for the presence call back. Note, that block 609 also removes the customer from the customer pool if the callback is successful.

After receiving control from decision block 602 of FIG. 6, block 701 of FIG. 7 requests the customer identification information for the customer who is requesting a presence call back. Decision block 702 then determines if this is a new customer based on the customer identification information received in block 701. If the answer is no in decision block 702, control is transferred to decision block 704.

Decision block 704 determines if the identified customer has or does not have stored device preference information. If the answer is yes in decision block 704, control is transferred to block 707. Block 707 presents the stored preference information to the customer. The presentation of this stored preference information will vary depending on the media that is being utilized by the customer. If the customer is utilizing a telephone, the information will be presented to the customer by voice. If the customer is utilizing a PC or another device having display capabilities, the information will be displayed to the customer. After execution of block 707, control is transferred to decision block 708.

Decision block 708 determines if the customer wants to change the preference information by sending an inquiry to the customer. If the answer is no in decision block 708, block 711 request and receives the type of presence service that is being requested for the callback. Next, block 712 stores this request in the customer pool before returning control to decision block 602 of FIG. 6.

Returning to decision block 708, if the answer is yes in decision block 708, control is transferred to block 709 which receives the changes to the device preference information from the customer and stores this received information before transferring control to block 711.

Returning to decision block 704, if the answer in decision block 704 is no, control is transferred to block 706. Block 706 receives and stores the device preference information from the customer before transferring control to block 711.

Returning to decision block 702, if the answer in decision block 702 is yes, control is transferred to block 703. Block 703 receives and stores the new customer identification and device preference information before transferring control to block 711.

In another embodiment utilizing the systems illustrated in FIGS. 1 and 2, when a customer contacted the call center and could not obtain service, the customer would be given the opportunity to specify the presence information defining the topic, agent, and media for that type of a callback from the call center (also referred to as service presence). The call center would then register with a presence service such as presence server 206 or use the presence SIP protocol to publish a service presence of a specified type of callback. When the call center could provide the necessary service for the callback as had been requested, the call center then would publish the service presence for use by a customer device. At a later point in time, the device used by the customer would determine the presence of the specified callback as presented by the call center and initiate a connection with the call center. To complete the initiation of the callback, the device used by the customer could grant or deny access from the call center.

Figure 8:
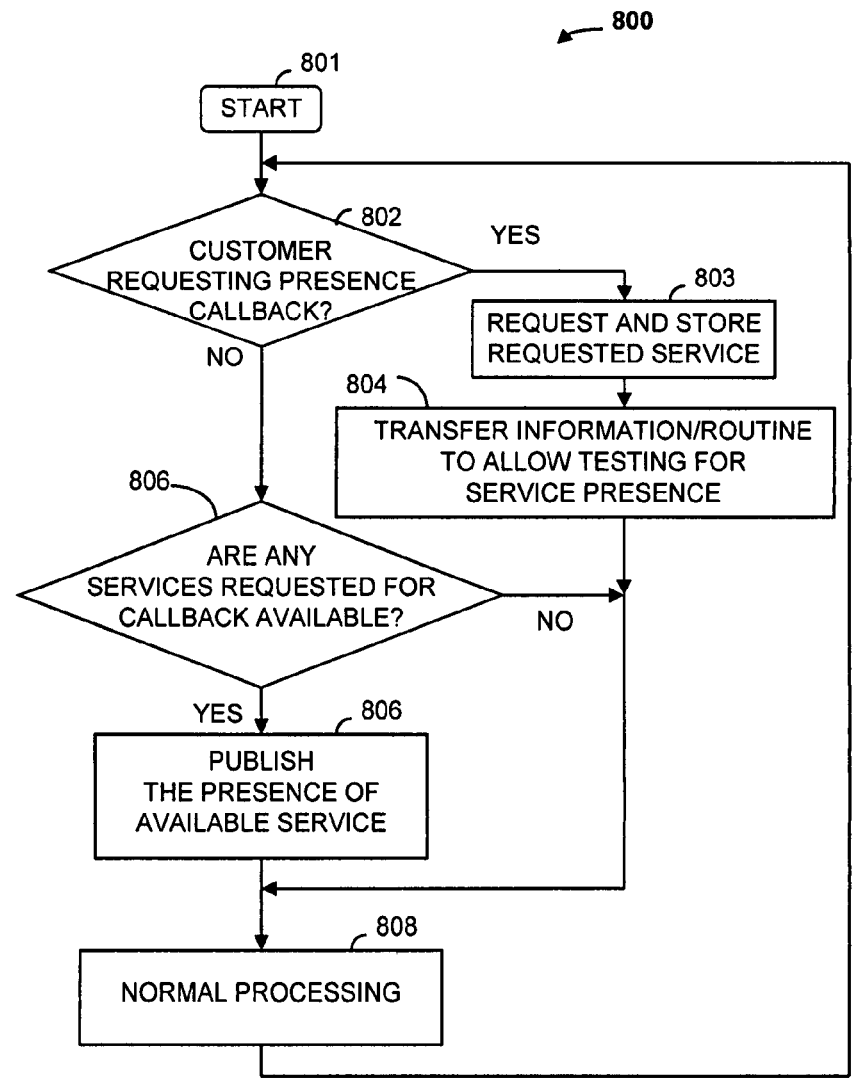
FIG. 8 illustrates, in flowchart form, the operations of a call center in an embodiment where the call center publishes a service presence.

FIG. 8 illustrates operations 800 that would be implemented by the call center of FIG. 1 or 2 in providing the embodiment where the call center publishes the service presence. After being started in block 801, decision block 802 determines if a customer is requesting a presence callback. If the answer is yes, the call center requests, receives, and stores the requested callback service by execution of block 803 before transferring control to block 804. Block 803 would determine if the customer requesting the callback service was a known customer and had a preference for the type of callback service. Block 804 transmits information or if necessary a routine for testing for service presence to the device which is to test the service presence when published by the call center. After execution of block 804, control is transferred to block 808 which performs normal processing before transferring control back to decision block 802.

Returning to decision block 802, if the answer in decision block 802 is no, control is transferred to decision block 806. The latter decision block determines if any of the callback services requested are available. If the answer is no, control is transferred to block 808. If the answer in decision block 806 is yes, control is transferred to block 807 that publishes the presence of the available callback service before transferring control to block 808.

Figure 9:
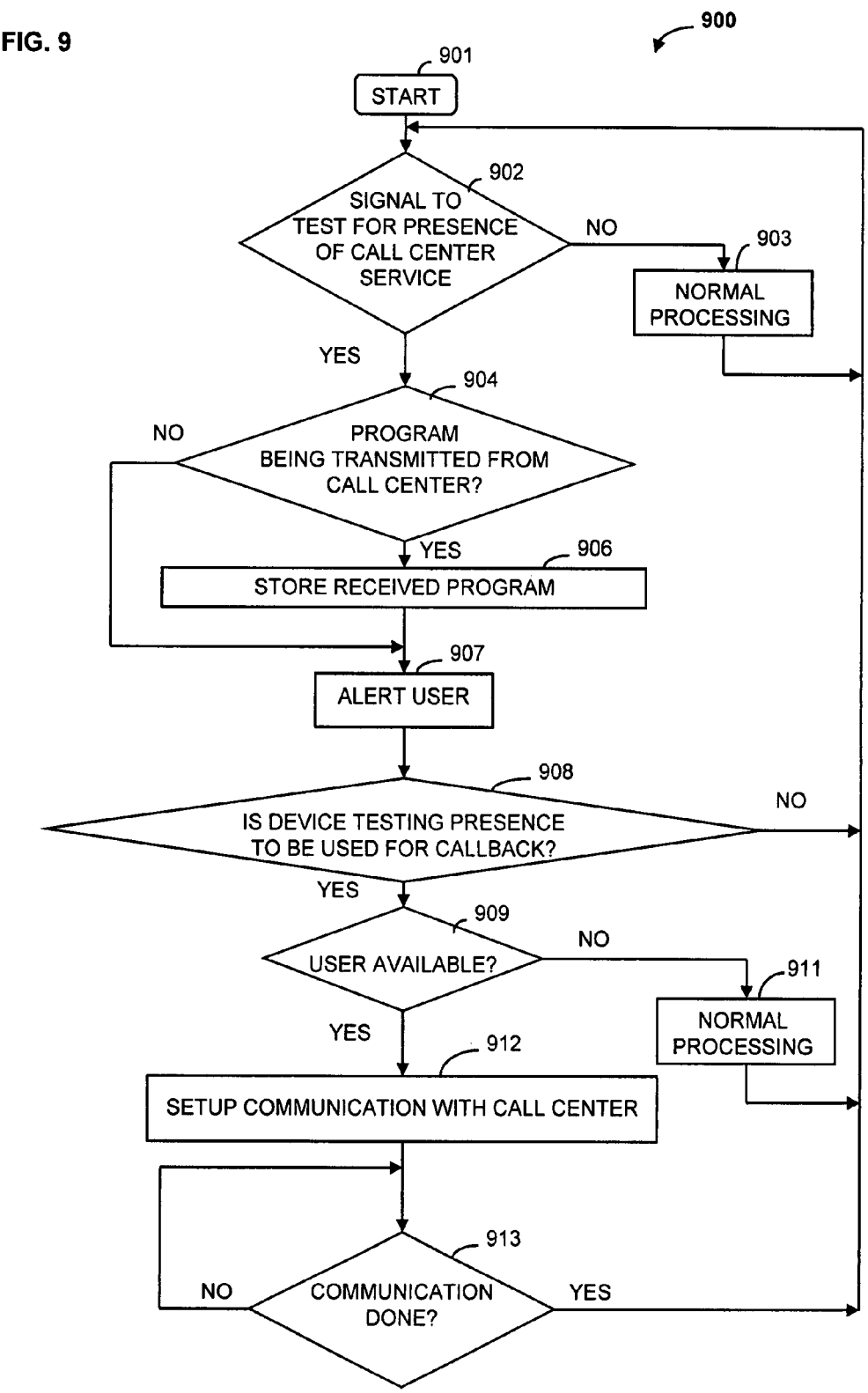
FIG. 9 illustrates, in flowchart form, the operations of a device in an embodiment where the call center publishes a service presence.

FIG. 9 illustrates operations 900 that would be implemented by a device of FIG. 1 or 2 in providing the embodiment where the call center publishes service presence. In FIG. 1, this device could be IP telephone 112, PC 113, or server 114. After being started in block 901, decision block 902 determines if a signal to test for the presence of the call center service has been received. This signal to test for the service presence may be manually generated by the user of the device or may be transmitted from the call center. If the signal is from the call center, the call center may simply transmit a message indicating that testing for the service presence is to commence or the call center may transmit down a Web routine as was previously described with respect to the devices of FIGS. 1 and 2. If the answer in decision block 902 is no, control is transferred to block 903 which performs normal processing before returning control back to decision block 902.

If the answer in decision block 902 is yes, decision block 904 determines if a program is being transmitted from the call center. If the answer is no, control is transferred to block 907. If the answer is yes in decision block 904, block 906 stores the received program before transferring control to block 907.

Block 907 alerts the user before transferring control to decision block 908.

The device being utilized to test for the presence of the call center may not be the device which the user will utilize for using this callback service. Decision block 908 tests if the device testing for the presence is to be used for the callback. If the answer is no, control is transferred back to decision block 902 since the user had already been alerted by block 907.

If the answer in decision block 908 is yes, decision block 909 determines if the user is available. If the answer is no, block 911 performs normal processing before transferring control back to decision block 902.

If the answer is yes in decision block 909, block 912 sets up communication with the call center before transferring control to decision block 913. Decision block 913 determines when the communication is done and then transfers control back to decision block 902.

When the operations of a computer, processor, telephone or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The computer, processor, telephone or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the computer, processor, telephone or server is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for call center callback, comprising:
   requesting a callback from a call center by a customer for one of a plurality of call center services upon the one of the plurality of call center services being presently unavailable;
   controlling by a server communication of a plurality of local devices to a network;
   detecting by the server a published presence of the one of plurality of call center services whereby the published presence is published by the call center upon the one of the plurality of call center services becoming available;
   detecting by the server the presence of the customer at one of the plurality of local devices;
   alerting by the server the customer of the published presence of the one of plurality of call center services via one of the plurality of local devices; and
   establishing by the server communication between the customer and the call center in response to the published presence and presence of the customer.

2. The method of claim 1 wherein the plurality of call center services comprises at least one of media used for callback, agent identification, or type of agent.

3. A computer-readable non-transitory medium for controlling call center callback, comprising computer-executable instructions configured for:
   requesting a callback from a call center by a customer for one of a plurality of call center services upon the one of the plurality of call center services being presently unavailable;
   controlling by a server communication of a plurality of local devices to a network;
   detecting by the server a published presence of the one of plurality of call center services whereby the published presence is published by the call center upon the one of the plurality of call center services becoming available;
   detecting by the server the presence of the customer at one of the plurality of local devices;
   alerting by the server the customer of the published presence of the one of plurality of call center services via one of the plurality of local devices; and
   establishing by the server communication between the customer and the call center in response to the published presence and presence of the customer.

4. The computer-readable non-transitory medium of claim 3 wherein the plurality of call center services comprises at least one of media used for callback, agent identification, or type of agent.

* * * * *